United States Patent
Westermaier

(10) Patent No.: US 6,219,927 B1
(45) Date of Patent: Apr. 24, 2001

(54) MANUAL ADJUSTER FOR PRESTRESSING A DIFFERENTIAL GEAR AND METHOD OF MAKING A DIFFERENTIAL GEAR USING SAME

(75) Inventor: Fritz Westermaier, Antdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/180,938

(22) PCT Filed: Apr. 18, 1997

(86) PCT No.: PCT/EP97/01939

§ 371 Date: Jun. 24, 1999

§ 102(e) Date: Jun. 24, 1999

(87) PCT Pub. No.: WO97/44597

PCT Pub. Date: Nov. 27, 1997

(30) Foreign Application Priority Data

May 17, 1996 (DE) .............................................. 196 19 937

(51) Int. Cl.$^7$ ..................................................... G01B 5/14
(52) U.S. Cl. ................................. 33/501; 33/710; 33/813; 33/833
(58) Field of Search .............................. 33/501, 710, 712, 33/783, 813, 814, 815, 818, 819, 827, 831, 832, 833, 836

(56) References Cited

U.S. PATENT DOCUMENTS

| 4,174,575 | * | 11/1979 | Nakata | 33/814 |
| 4,492,018 | | 1/1985 | Rode | 29/437 |
| 5,433,015 | * | 7/1995 | Mazanat | 33/815 |
| 6,021,580 | * | 2/2000 | Manfredotti et al. | 33/712 |
| 6,036,541 | * | 3/2000 | Choi | 33/710 |

FOREIGN PATENT DOCUMENTS

| 36 26 442 | 2/1988 | (DE) . |
| 0 604 763 | 7/1994 | (EP) . |
| 55072939 | 6/1980 | (JP) . |
| 57124120 | 8/1982 | (JP) . |

* cited by examiner

Primary Examiner—Christopher W. Fulton
(74) Attorney, Agent, or Firm—Evenson, McKeown, Edwards & Lenahan, P.L.L.C.

(57) ABSTRACT

A differential gear housing includes grooves into which retaining rings are fitted which engage on races of tapered roller bearings. The width of the securing rings is determined in accordance with the desired tooth flank clearance between a ring gear and a bevel drive pinion and with a desired prestress in the tapered roller bearings. Preliminary to selecting the retaining rings, devices are used which engage with a tensioning bush in the grooves and have a pressure member movable axially inside the tensioning bush and supported on the respective tapered roller bearing race. The pressure member is then suitably moved in relation to the tensioning bush to a position where the desired prestress and tooth flank clearance have been reached. The desired retaining ring axial width can then be read off from the device followed by selection and insertion of the desired retaining rings.

22 Claims, 3 Drawing Sheets

MANUAL ADJUSTER FOR PRESTRESSING A DIFFERENTIAL GEAR AND METHOD OF MAKING A DIFFERENTIAL GEAR USING SAME

The invention relates to a manual adjuster for prestressing a differential gear, in which case retaining rings are inserted in receiving grooves provided in the gearbox and rest against bearing rings of tapered roller bearings of two ring gear axle ends, and in which case the width of the retaining rings is determined with a view to a desired tooth surface play between the ring gear and a bevel drive pinion meshing therewith, on the one hand, and to a desired prestressing force, on the other hand. Concerning the known prior art, reference is made, for example, to German Patent Document DE 36 26 442 A1.

During their assembly, differential gears or rear axle gears of motor vehicles must be adjusted as precisely as possible, specifically with a view to the prestressing of the tapered roller bearings which are provided in the gearbox and carry the usual ring gear by way of axle ends as well as with a view to the tooth surface play between the ring gear and a bevel drive pinion meshing with the ring gear. In this case, a simple construction of the transmission is obtained by means of the above-mentioned retaining rings which are adapted with respect to their width and on which the bearing rings, particularly the outer bearing rings of the tapered roller bearings are supported. The determination of the required width of the retaining rings—particularly in the shop situation—can take place by trial and error; that is, experimentally retaining rings of different widths are installed until the desired values for the tooth surface play as well as for the prestressing force are reached. However, this is unsatisfactory so that the invention has the object of providing a manual adjusting device for the prestressing which is easy to handle and by means of which the required retaining ring width can be determined in a simple manner.

The achieving of this object is characterized by device parts which are assigned to the two receiving grooves and, in each case, engage in these by means of a tension bush and which, in addition, each have a pressure piece which can be axially displaced inside the tension bush and is in each case supported on the bearing ring of the tapered roller bearing, a set wheel, which displaces the pressure piece by way of an adjusting spindle, being provided on the first device part, while a pressure spindle applying the required prestressing force acts upon the pressure piece of the second device part. Advantageous developments and further developments are the content of the subclaims.

The invention will be explained in detail by means of a preferred embodiment.

Figure 1:
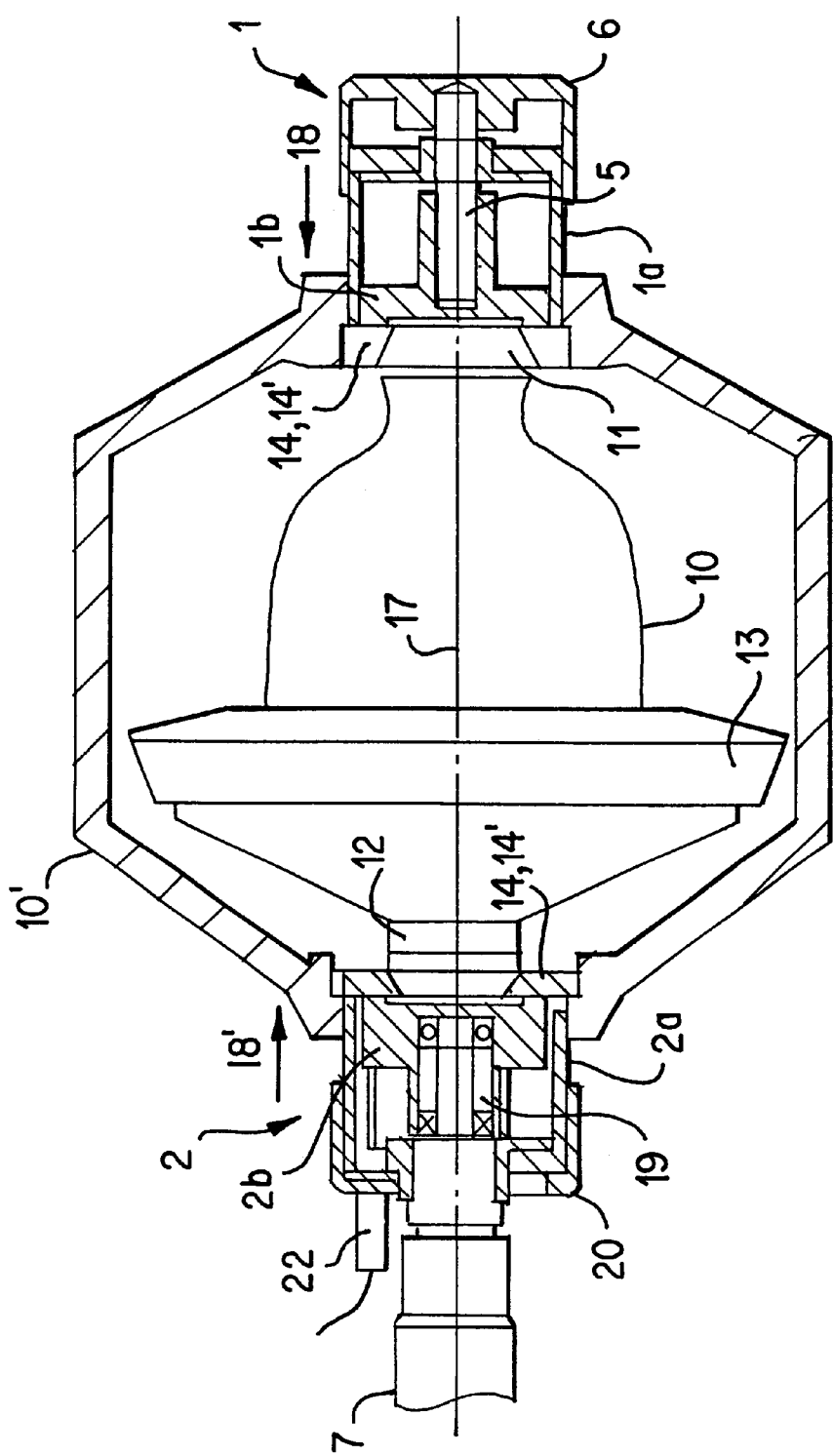
FIG. 1 is a sectional view of a differential gear having an adjusting device situated on it.
Figure 2:
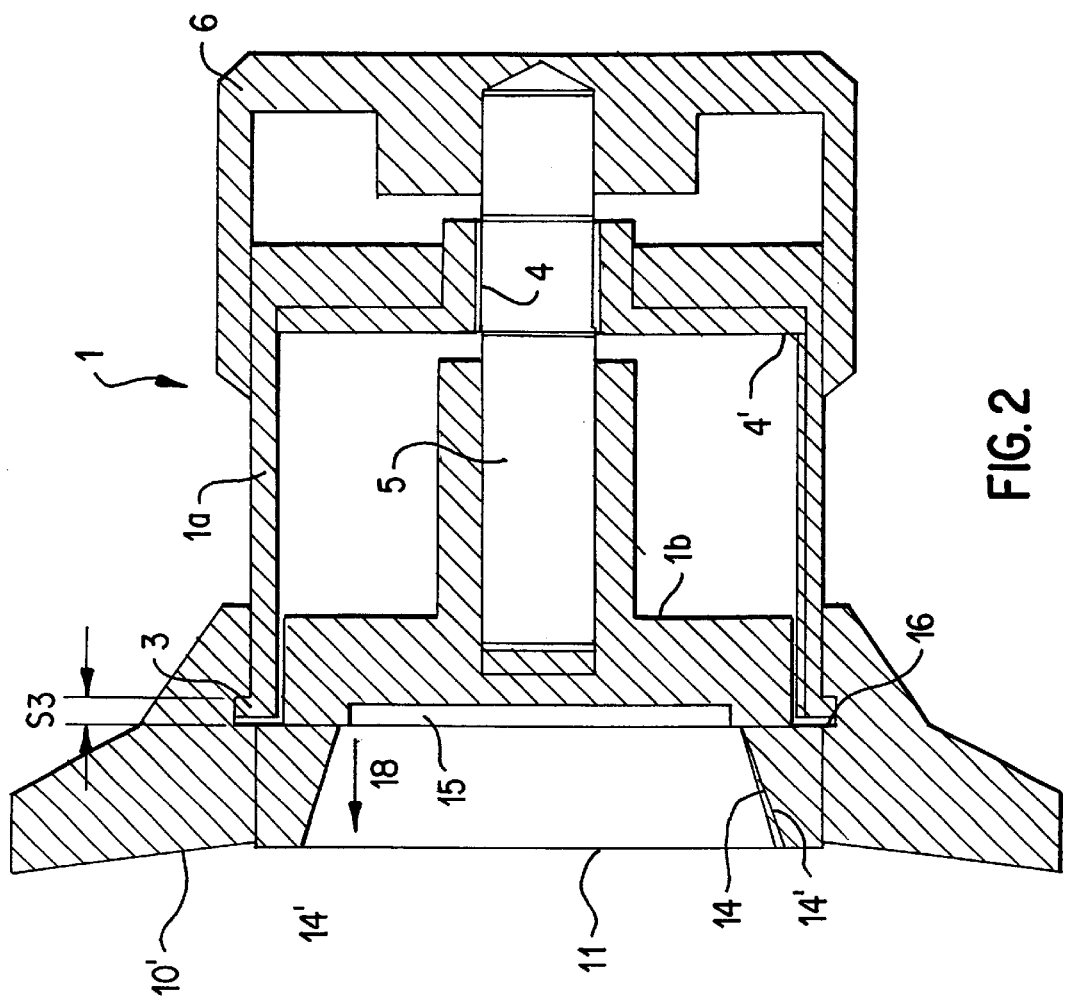
FIG. 2 is an enlarged sectional view of the first device part.
Figure 3:
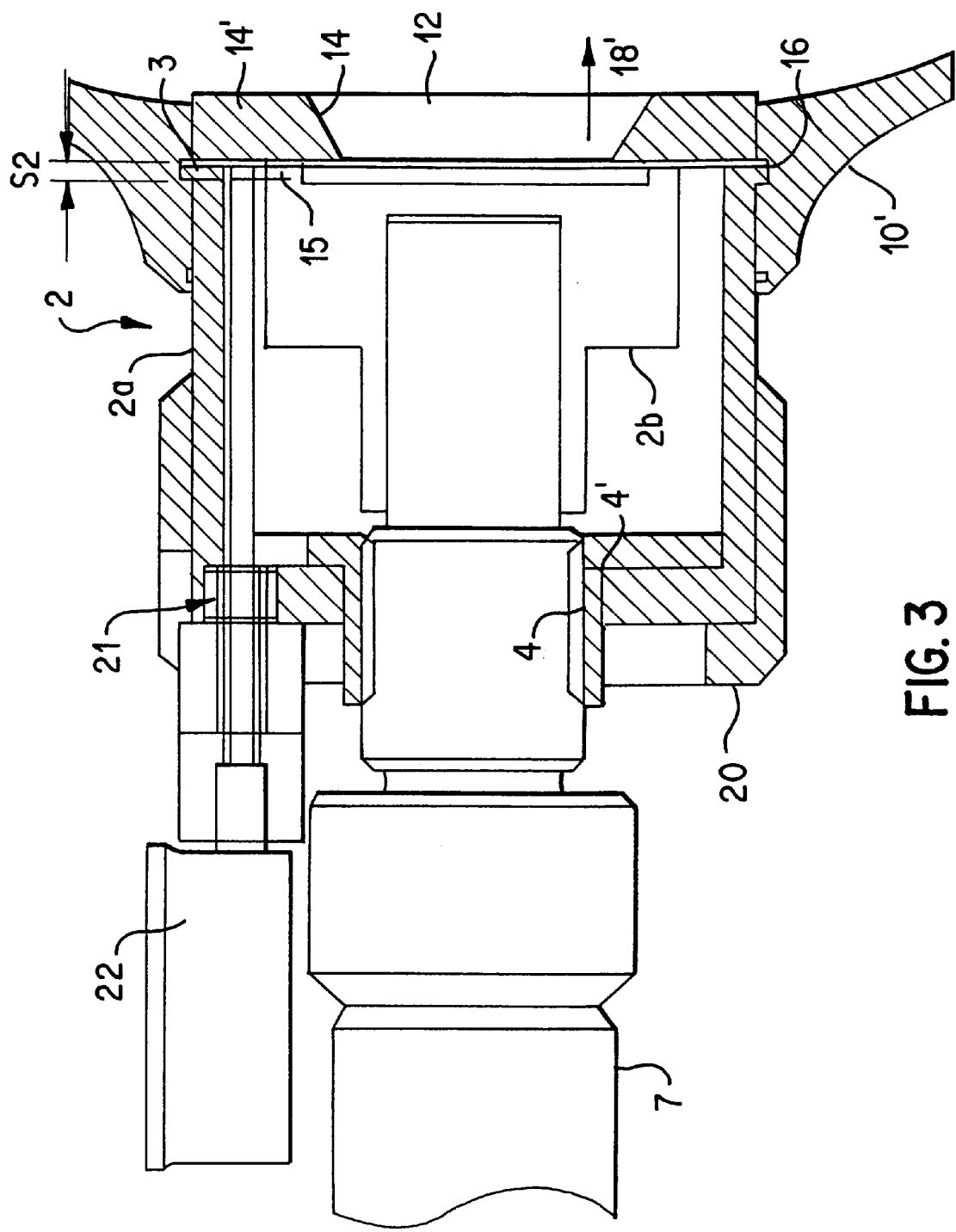
FIG. 3 is an enlarged sectional view of the second device part.

The reference number 10' indicates a gearbox of a differential gear which, as a whole, has the reference number 10 and in which, as customary, in addition to a ring gear 13, a bevel drive pinion, which is not shown, is disposed which meshes with the ring gear 13. The ring gear 13 is supported by two axle ends 11, 12, which, in a customary known manner, are disposed in the gearbox 10' by way of tapered roller bearings 14. For this purpose, each tapered roller bearing 14 has a bearing ring 14' or an outer bearing ring 14' which is in each case supported toward the outside on a retaining ring 15 which is illustrated in FIGS. 2, 3, in each case in the upper half, by a broken line. This retaining ring 15, which is guided in a receiving groove 16 in the housing 10', is shown only by a broken line in FIGS. 2, 3 because, during this illustrated condition, during which the manual adjusting device, which will be described below, is attached to the differential gear 10, is not at all situated in the gearbox 10'. However, it is clearly demonstrated that, by way of the width of the two retaining rings 15 (in FIG. 1, on the left-side as well as on the right-side tapered roller bearing 14), not only the prestressing force acting in the tapered roller bearings 14 is determined but also the tooth surface play between the ring gear 13 and the bevel drive pinion which meshes with it.

The determination of the required width of the retaining rings 15 for achieving the desired prestressing force as well as the desired tooth surface play takes place as follows:

The first device part of the manual adjusting device, which as a whole has the reference number 1, while the retaining ring 15 is left out, is inserted in the area of the right-side tapered roller bearing 14 into the gearbox 10', while the second device part 2 is inserted into the gearbox 10' in the area of the left-side tapered roller bearing 14. Then a basic adjustment is made at the device part 1, after which the required prestressing force is applied by means of the device part 2. By means of this basic adjustment, the tooth surface play can now be measured. If this tooth surface play is not yet in the desired range, the prestressing force on the device part 2 is reduced and the basic adjustment is correspondingly changed on the device part 1. After another application of the required prestressing force by way of the device part 2, the tooth surface play can be measured again. This operation can be repeated until the tooth surface play has the desired value, after which the respective actual retaining ring width can be read at the two device parts 1 and 2. This will be achieved by the method described in detail in the following.

The device part 1 as well as the device part 2 each have a so-called tension bush 1a and 2a, each tension bush 1a, 2a having a collar 3 on its free end, by means of which collar 3, they can be inserted into the respective receiving groove 16 in the gearbox 10'. In order to permit this insertion, each tension bush 1a, 2a must be constructed to be divided in the direction of its longitudinal axis (=axis direction 17); that is, it consists of at least two partial shells in order to permit the insertion by means of the collar 3 provided at the free end into the receiving groove 16.

One pressure piece 1b, 2b respectively, which can be displaced in the axis direction 17 and which, in the illustrated condition, is in each case supported on the assigned bearing ring 14, is provided coaxially within the tension bush 1a, 2a in the case of both device parts 1, 2.

In the case of the first device part 1, an adjusting spindle 5 is applied to the pressure piece 1b and supports itself on the tension bush 1a by way of a thread 4, and the free end of the adjusting spindle carries a set wheel 6. In the embodiment illustrated here, the thread 4 is provided in a threaded bush 4' which, in turn, is supported on the tension bush 1a. However, deviating from this embodiment, the thread 4 can also be provided directly in the tension bush 1a. By means of this device part 1, it is therefore always possible to axially displace the pressure piece 1b with respect to the tension bush 1a by turning the set wheel 6 and thus— because the tension bush 1a is supported on the gearbox 10'—apply a prestressing force according to the direction of the arrow 18 to the bearing ring 14' by means of the pressure piece 1b.

In addition to a tension bush 2a, a pressure piece 2b is also provided on the device part 2—as explained above—, which pressure piece 2b can apply a prestressing force 18' acting against the direction of the arrow 18 to the corresponding bearing ring 14' of the tapered roller bearing 14, so that, on the whole, by means of the two pressure pieces 1b, 2b or by means of the two device parts 1, 2, the two tapered roller bearings 14 can be prestressed. In this case, a pressure spindle 7 acts upon the pressure piece 2b, which pressure spindle 7 can, for example, be hydraulically operated, that is, can be displaced in the direction of the arrow 18'. In order to permit in this case that the pressure spindle 7, which again is supported by way of a thread 4 as well as by way of a threaded bush 4' on the tension bush 2a, can be rotated about the axis 17, a roller bearing arrangement 19 is provided between the end of the pressure spindle 7 as well as the pressure piece 2b. In addition, a centering ring 20 is situated on the device part 2 for its precise positioning.

While a measuring scale, which is not shown in detail, is provided on the device part 1, on which measuring scale, with the interaction of the set wheel 6 and the tension bush 1a, the required width of the retaining ring, that is, the required distance S3, can be read, a receiving device 21 for a measuring device 22 for determining the width S2 of the assigned retaining ring 15 is provided on the device part 2. This measuring device 22 may be a metering clock.

Therefore, as briefly explained above, during the assembly of the differential gear 10, first, the two retaining rings 15 are left out and replaced by the two device parts 1, 2. By means of the set wheel 6, a basic adjustment is first made at the device part 1. Then, by means of the pressure spindle 7, the required prestressing force is applied to the device part 2 in the direction of the arrow 18'. As a rule, the tooth surface play between the ring gear 13 and the bevel drive pinion will now not have the desired value. After the return of the prestressing force according to the direction of the arrow 18' on the device part 2, a new adjustment can take place on the device part 1 by means of the set wheel 6, specifically in a direction so that the tooth surface play will come closer to the desired value. Subsequently, the required prestressing force according to the direction of the arrow 18' is again applied to the device part 2 by means of the pressure spindle 7. If now the tooth surface play, which must be measured again, is in the desired value range, the required retaining ring width S3 can be read on the briefly described measuring scale. This is also possible on the device part 2 by means of the preadjusted measuring device 22. Then the device parts 1, 2 of the described adjusting device are removed and the respectively required retaining rings 15 with the width dimensions S3 and S2 are inserted. The described adjusting operation can therefore be implemented in an extremely simple and time-saving manner by means of the described manual adjusting device, in which case, in a single operation, the prestressing of the tapered roller bearings 14 as well as the desired tooth surface play can be adjusted. Naturally, a plurality of details, particularly of a constructive type, may deviate from the illustrated embodiment without leaving the contents of the claims.

What is claimed is:

1. Adjuster assembly for a differential gear which has:
    a gear box with first and second axially spaced gear box grooves,
    a gear axle carrying a ring gear which in use meshes with a bevel drive pinion, said gear axle having first and second axle ends,
    a first retaining ring insertable in the first gear box groove,
    a first tapered roller bearing having a first roller bearing ring resting against the first retaining ring and operable to support the first axle end at the gear box,
    a second retaining ring insertable in the second gear box groove, and
    a second tapered roller bearing having a second roller bearing ring resting against the second retaining ring and operable to support the second axle end at the gear box,
    wherein tooth play between the ring gear and bevel drive pinion and prestressing force at the roller bearing are dependent on axial thicknesses of the first and second retaining rings,
    said adjuster assembly being operable to determine desired axial thicknesses of said retainer rings prior to selection and insertion of the retainer rings, and comprising:
    (i) a first adjusting device having a first tension bush supportingly engageable in the first gear box groove, a first pressure piece axially displaceable in the first tension bush and supportable at the first roller bearing ring, and a first adjusting spindle operable to displace the first pressure piece with respect to the first tension bush, and
    (ii) a second adjusting device having a second tension bush supportingly engageable in the second gear box groove, a second pressure piece axially displaceable in the second tension bush, and a second adjusting spindle operable to displace the second pressure piece with respect to the second tension bush,
    said first and second adjusting devices including measuring devices indicating desired retainer ring thicknesses based upon use of the adjusting devices to determine desired tooth play between the ring gear and bevel drive pinion and prestressing force at the tapered roller bearings.

2. Adjuster assembly according to claim 1, wherein the measuring devices include a measuring scale provided on the first adjusting device which indicates a desired axial width of the first retaining ring.

3. Adjuster assembly according to claim 2, wherein the measuring devices include a measuring scale provided on the second adjusting device which indicates a desired axial width of the second retaining ring.

4. Adjuster assembly according to claim 3, therein each tension bush includes at least two partial shells configured to accommodate insertion thereof by respective collars on their free ends into the respective gear box grooves.

5. Adjuster assembly according to claim 3, wherein said first adjusting spindle is connected with a manually operable set screw handle for rotating the first adjusting spindle with a threaded connection operable to axially displace the first pressure piece and first tension bush with respect to one another.

6. Adjuster assembly according to claim 5, wherein the second adjusting spindle is connected with a hydraulic drive for operating a threaded connection operable to axially displace the second pressure piece and second tension bush with respect to one another.

7. Adjuster assembly according to claim 3, wherein the second adjusting spindle is connected with a hydraulic drive for operating a threaded connection operable to axially displace the second pressure piece and second tension bush with respect to one another.

8. Adjuster assembly according to claim 2, wherein each tension bush includes at least two partial shells configured to accommodate insertion thereof by respective collars on their free ends into the respective gear box grooves.

9. Adjuster assembly according to claim 1, wherein the measuring devices include a measuring scale provided on the second adjusting device which indicates a desired axial width of the second retaining ring.

10. Adjuster assembly according to claim 9, wherein each tension bush includes at least two partial shells configured to accommodate insertion thereof by respective collars on their free ends into the respective gear box grooves.

11. Adjuster assembly according to claim 1, wherein each tension bush includes at least two partial shells configured to accommodate insertion thereof by respective collars on their free ends into the respective gear box grooves.

12. Adjuster assembly according to claim 1, wherein said first adjusting spindle is connected with a manually operable set screw handle for rotating the first adjusting spindle with a threaded connection operable to axially displace the first pressure piece and first tension bush with respect to one another.

13. Adjuster assembly according to claim 12, wherein the second adjusting spindle is connected with a hydraulic drive for operating a threaded connection operable to axially displace the second pressure piece and second tension bush with respect to one another.

14. Adjuster assembly according to claim 1, wherein the second adjusting spindle is connected with a hydraulic drive for operating a threaded connection operable to axially displace the second pressure piece and second tension bush with respect to one another.

15. A method of making a differential gear which has
- a gear box with first and second axially spaced gear box grooves,
- a gear axle carrying a ring gear which in use meshes with a bevel drive pinion, said gear axle having first and second axle ends,
- a first retaining ring insertable in the first gear box groove,
- a first tapered roller bearing having a first roller bearing ring resting against the first retaining ring and operable to support the first axle end at the gear box,
- a second retaining ring insertable in the second gear box groove, and
- a second tapered roller bearing having a second roller bearing ring resting against the second retaining ring and operable to support the second axle end at the gear box,
- wherein tooth play between the ring gear and bevel drive pinion and prestressing force at the roller bearings are dependent on axial thicknesses of the first and second retaining rings,
- said method including
  (i) providing an adjusting assembly including:
  - a first adjusting device having a first tension bush supportingly engageable in the first gear box groove, a first pressure piece axially displaceable in the first tension bush and supportable at the first roller bearing ring, and a first adjusting spindle operable to displace the first pressure piece with respect to the first tension bush, and
  - a second adjusting device having a second tension bush supportingly engageable in the second gear box groove, a second pressure piece axially displaceable in the second tension bush, and a second adjusting spindle operable to displace the second pressure piece with respect to the second tension bush,
  - said first and second adjusting devices including measuring devices indicating desired retainer ring thicknesses based upon use of the adjusting devices to determine desired tooth play between the ring gear and bevel drive and pinion prestressing force at the tapered roller bearings, and
  - using said adjuster assembly to determine desired thicknesses of the retainer rings and subsequently to remove the adjusting devices and insert the retainer rings for final assembly of the differential gear.

16. A method according to claim 15, wherein the measuring devices include a measuring scale provided on the first adjusting device which indicates a desired axial width of the first retaining ring.

17. A method according to claim 16, wherein the measuring devices include a measuring scale provided on the second adjusting device which indicates a desired axial width of the second retaining ring.

18. A method according to claim 15, wherein the measuring devices include a measuring scale provided on the second adjusting device which indicates a desired axial width of the second retaining ring.

19. A method according to claim 15, wherein each tension bush includes at least two partial shells configured to accommodate insertion thereof by respective collars on their free ends into the respective gear box grooves.

20. A method according to claim 15, wherein said first adjusting spindle is connected with a manually operable set screw handle for rotating the first adjusting spindle with a threaded connection operable to axially displace the first pressure piece and first tension bush with respect to one another.

21. A method according to claim 20, wherein the second adjusting spindle is connected with a hydraulic drive for operating a threaded connection operable to axially displace the second pressure piece and second tension bush with respect to one another.

22. A method according to claim 15, wherein the second adjusting spindle is connected with a hydraulic drive for operating a threaded connection operable to axially displace the second pressure piece and second tension bush with respect to one another.

* * * * *